United States Patent [19]

Levine

[11] Patent Number: 4,567,524

[45] Date of Patent: Jan. 28, 1986

[54] SMEAR REDUCTION IN CCD IMAGERS USING EMPTY WELL CLOCKING

[75] Inventor: Peter A. Levine, Mercer County, N.J.

[73] Assignee: RCA Corporation, Princeton, N.J.

[21] Appl. No.: 554,085

[22] Filed: Nov. 21, 1983

Related U.S. Application Data

[63] Continuation-in-part of Ser. No. 407,926, Aug. 13, 1982, which is a continuation-in-part of Ser. No. 393,733, Jun. 30, 1982, abandoned.

[51] Int. Cl.[4] ............................................. H04N 3/14
[52] U.S. Cl. ...................................... 358/213; 357/24
[58] Field of Search ........................ 358/213, 209, 41; 357/24 LR, 30; 250/578

[56] References Cited

U.S. PATENT DOCUMENTS 3,777,061 12/1973 Takemura ........................... 358/213
4,010,319 3/1977 Levine ................................. 358/213
4,032,976 6/1977 Levine ................................. 358/213

Primary Examiner—Gene Z. Rubinson
Assistant Examiner—Stephen Brinich
Attorney, Agent, or Firm—Joseph S. Tripoli; George E. Haas; Allen LeRoy Limberg

[57] ABSTRACT

Radiation illuminating the image register of a CCD imager of field transfer type during the transfer of a charge pattern from image register to field storage register results in smear in images reproduced from the imager output signal. Smear charge samples are sensed during one line time of a field and stored, and the stored line of smear charge samples are then used to cancel the effect of smear charge components in the other lines of a field. The lines of smear charge samples are obtained by clocking a line of empty charge wells into the A register as from a "phantom" row which does not physically exist.

17 Claims, 8 Drawing Figures

SMEAR REDUCTION IN CCD IMAGERS USING EMPTY WELL CLOCKING

The present application is a continuation-in-part of U.S. Pat. app. Ser. No. 407,926 filed Aug. 13, 1982, which was a continuation-in-part of U.S. Pat. app. Ser. No. 393,733 filed June 30, 1982 and now abandoned. U.S. patent Ser. No. 407,926 issued Dec. 25, 1984 as U.S. Pat. No. 4,490,744 entitled Smear Reduction Techniques for CCD Field-Transfer Image System.

The present invention relates to the reduction of smear generated in images reproduced from a CCD imager of the field transfer type, responsive to the imager not being shielded from radiation during field transfer intervals.

My U.S. Pat. No. 4,010,319 issued Mar. 1, 1977, entitled "SMEAR REDUCTION IN CCD IMAGERS", and incorporated herein by reference describes how this undesirable smear is generated. In one apparatus described in that patent, smear charge samples are generated during field transfer and stored in a masked row at the output end of the image (or A) register connecting to the input end of the field storage (or B) register. The line of smear charge samples remains in the A register over the next field integration time and is forwarded through the B register during the ensuing field transfer time. At the beginning of the field integration time the line of charge samples is transferred to a storage register and is subsequently differentially combined with rows of image samples extracted from the B register during the next field time, this combining being done to reduce smear.

In another of the apparatuses described in U.S. Pat. No. 4,010,319 charge samples in a masked row at the input end of the A register furthest from the B register are clocked through to the B register during field transfer interval to provide a line of smear samples. In CCD imagers where the charge samples are clocked forward a row at a time from the B register to a parallel-input-serial-output line register (or C register) at the opposite end of the B register from A register, the smear is delayed for the time required to clock the earlier rows of the field through the B register. It is then stored during the next field and subtractively combined with the lines of that next field to suppress smear.

This latter apparatus can be constructed omitting the masked row in the A register without adversely affecting operation. Continuing the synchronous clocking of the A and B registers past the field transfer interval, for the time previously required to clock into the B register the charge samples originally arising under the masked row, surprisingly still results in a "phantom row" of smear charge samples being transfered into the last row of the B register. Further, the smear charge samples in the phantom row are not accompanied by strong dark current components from one line of the A register (accumulated during the relatively long image integration time). Rather, the smear charge samples are accompanied only by relatively weak dark current components (accumulated during the relatively short. A register to B register transfer time. These dark current components are averages of the dark currents in all charge storage locations in each of the several columns of the A register. So dark current anomalies in a row at the edge of the A register have much less power to introduce error into the smear correction, which error evidences itself as striations in an image generated from the imager output signal.

CCD imagers of field transfer type can be constructed with the radiation mask evaporated or sputtered onto the glassy passification layer of the imager semiconductor die. Avoiding the passage of radiation at skew angles under a single-row-width mask presents difficulty even with such an integral mask; this "creep-under" effect is obviated by the new mode of acquiring smear charge signals set forth above. CCD imagers are conventionally made with extra rows in the A register before the B register, which extra rows are masked so creep-under into the B register is not a problem. The method of the present invention for acquiring smear charge samples without masking any rows in the A register of a CCD imager of field transfer type, but rather clocking forward a phantom row of charge samples then, facilitates using smear reduction with presently available CCD imagers having integral masks. The invention allows one standard integral mask for CCD imagers and does not reduce the number of picture-integrating elements available in CCD imagers to be used without smear reduction.

In certain CCD imagers very few rows are used in the image and field storage registers. An example of this is where a row-sensor with color differentiating response would be desired. This is simulated by an array-sensor with a three-row image register and color selective filtering. Providing smear reduction using the prior art approach of masked row in the A register and a corresponding row of storage in the B register of a field transfer type of CCD array-sensor would increase the size of the sensor by nearly one-third. The extra row is not needed in the A register using the present invention. Where the A register rows are longer in the direction of column orientation than the B register rows are, as is sometimes done when anti-blooming drains are used, sensor size is increased by substantially less than one-sixth to accommodate smear reduction according to the method of the invention. Even this increase in size can be avoided by using the C register normally employed for parallel-to-serial conversion in lieu of the extra rows in the B register.

In more sophisticated systems of mine for reducing transfer smear it is desirable to obtain smear charge samples from the CCD imager before obtaining the image samples contaminated by transfer smear. This can be done by clocking forward an empty line of charge samples from a masked row at one end of the A register to accumulate the smear charge samples, loading those samples in parallel into a line register located at the other end of the A register, and then reading out the smear charge samples serially from that line register. One possible CCD imager structure is to interpose the C register between the A and B registers, arranging for passage through the C register stages (in a parallel-in, parallel-out mode of operation) of the successive lines of charge packets being transferred from A register to B register. The smear charge samples are left in the C register or the first line or so of the B register to be clocked out at the beginning of the first of the two fields containing image samples contaminated by that smear. Another possible CCD imager structure retains the A and C registers at opposite ends of the B register, but adds a line register at the end of the A register opposite to the end connecting to the B register. This line register denominated a "smear register" or "D register" has smear charge samples transferred to it by reverse-clocking of the A register during an interval following the field transfer interval and preceding the image integration time.

In these schemes for clocking smear charge samples into a line register immediately adjacent to one end of the A register, the empty line of charge samples to be transferred through the A register to accumulate smear charge samples can be clocked out of a masked line at the end of the A register opposite to the line register collecting them. But the smear charge samples will be accompanied by the dark current charge accumulated under the masked line over image integration time. Clocking a line of empty wells through the A register by continuing its clocking after field transfer, in accordance with the present invention, is a preferred way to generate the line of smear charge samples, since they will be relatively free of dark current component.

In summary, the present invention is a method for transfering smear charge samples from the A register of a field transfer type of CCD imager to an adjacent register by continuing to clock the A register after field transfer is completed, thereby to advance a line of empty wells into and through the A register, and to CCD imager systems in which the smear charge samples so transfered are used to suppress smear charge components in other charge samples extracted from the A register.

Figure 3:
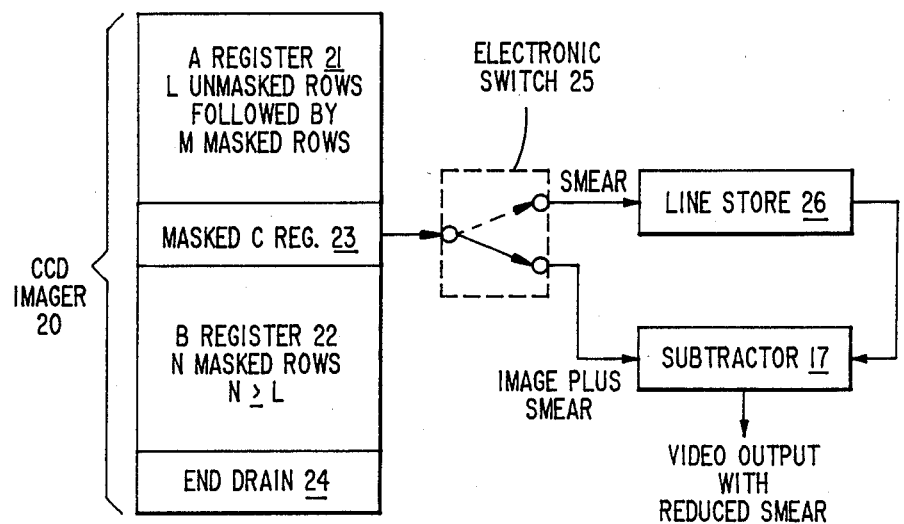
Figure 4:
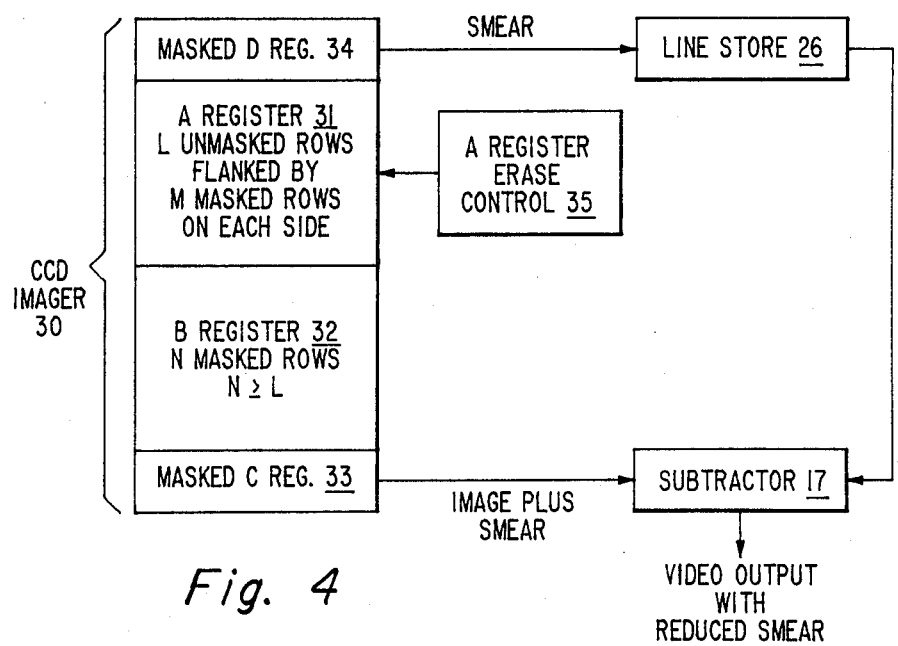

each of FIGS. 3 and 4 is a block schematic diagram of a field transfer type of CCD imager operable to provide a line of smear samples without B register field delay, in combination with smear reduction apparatus for operation in accordance with the invention; and each of FIGS. 5, 6, 7 and 8 is a block schematic of an imager system with field transfer type of CCD imager combined with apparatus for reducing transfer smear in accordance with the invention, for moving as well as stationary bright points in the image field.

Figure 1:
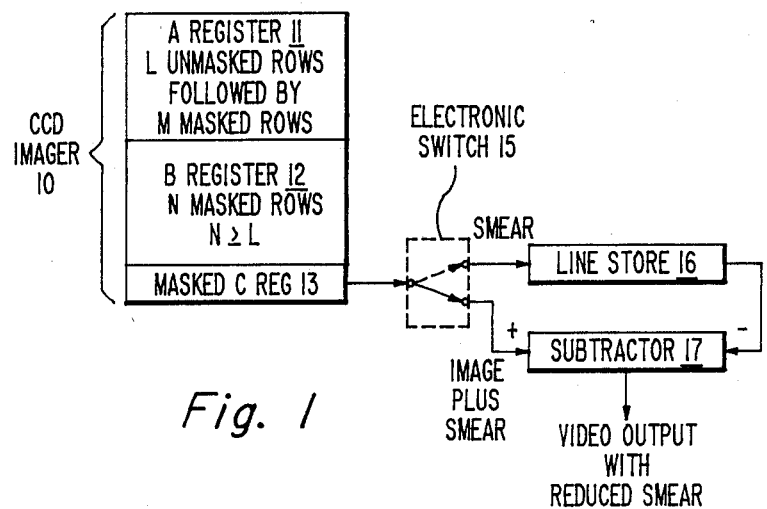
FIG. 1 is a block schematic diagram of a field transfer type of CCD imager with B register between A and C registers, in combination with smear reduction apparatus for operation in accordance with the invention.

In the FIG. 1 reduced-smear CCD imager system a CCD imager 10 of field transfer type is used which has L unmasked rows in its image (or A) register 11 followed by M masked rows. L and M are integers, L being at least one and typically being a substantial fraction of one thousand. M is at least zero typically being small. The field storage (or B) register 12 of imager 10 has N masked rows, N being an integer at least as large as L and normally larger than L by one or a somewhat larger number. Masked rows are in the A register of a CCD imager to keep the field of charge samples transferred into B register 12 from being affected by radiation leakage under the edge of the mask overlying it by extending the mask over the M extra rows in the A register.

During image integration intervals, clocking of the A register 11 is halted, and the photodetecting portions of the unmasked A register 11 accumulate a pattern of charge samples descriptive of picture elements (pixels) of an image projected into A register 11. These image integration intervals correspond with the field trace portions of video output signal voltage from a C register 13 of imager 10. C register 13 is used for converting to serial format charge samples clocked forward in parallel a line at a time from B register 12 during field trace. These serial-in-time charge samples are converted by an electrometer output stage associated with C register 13 to the video output signal voltage. In summary, as one image field is being integrated in A register 11, the previously integrated image field which has been transferred to B register 12 is converted to video output signal voltage in accordance with a conventional practice.

Figure 2:
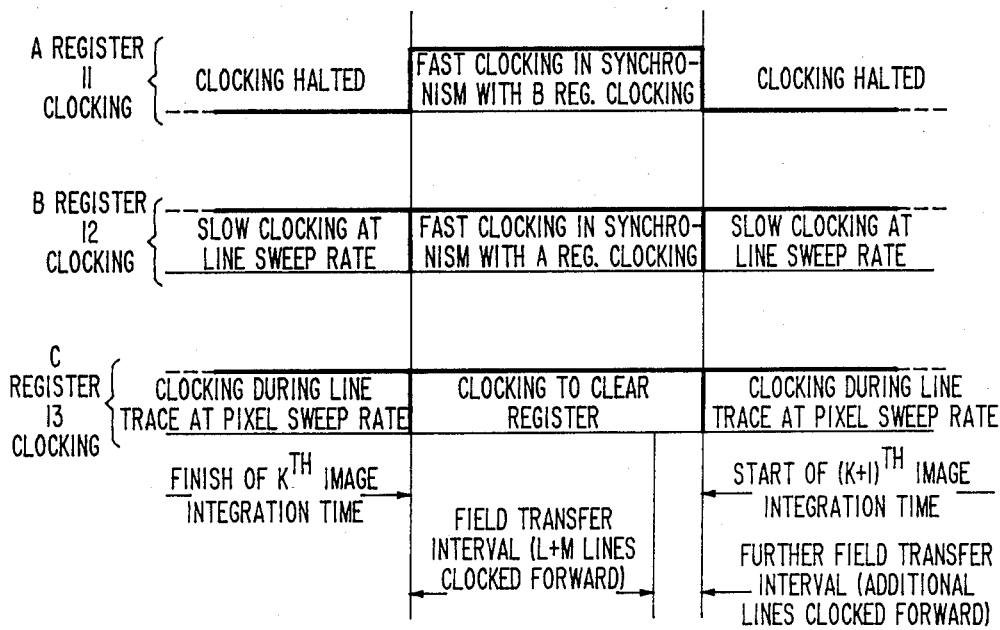
FIG. 2 is a timing diagram of the CCD imager clocking during such operation of the FIG. 1 apparatus.

FIG. 2 timing diagram shows the register clocking signals at the finish of the $K^{th}$ image integration time, where K is an arbitrary positive number. Clocking has been halted in A register 11 to permit image integration. B register 12 is clocked relatively slowly at line sweep rate to advance a line of charge samples during each line retrace portion of the video output signal to be furnished from C register 13. C register 13 has its clocking halted during line retrace when a line of charge samples is transferred in parallel to respective ones of its successive stages. Clocking at pixel sweep rate is resumed during each line trace to cause the shift register operation to convert the charge samples to serial-in-time format.

After each image integration time, during field retrace of the video output signal, the M lines of charge integrated under the masked rows of A register 11 are clocked through B register 12 and C register 13 and dumped. Then the field of charge samples accumulated in the L unmasked rows of A register 11 during the Kth image integration time is transferred to B register 12. If the A register 11 is shuttered so as to be masked during the transfer, transfer smear will not occur. But it is often desirable to perform the transfer without masking the A register 11 from impinging radiation. The synchronous clocking of A register 11 and B register 12 accomplishes the transfer of the field of charge samples from the one array register to the other, respective columns of the two array registers being in cascade connection for charge transfer responsive to such synchronous clocking. Conventionally, the A register 11 is forward clocked to transfer the charge samples in all of its L+M rows, those in its L unmasked rows being transferred to corresponding rows in B register 12. The time required for clocking forward these L+M lines of charge samples, so the final L lines of those charge samples are in the B register 12 rather than the A register 11, will by the strict definition of this specification be referred to as the "field transfer interval".

FIG. 2 shows this field transfer interval in which there is fast clocking of the B register 12 as compared to its slow clocking at line sweep rate during the field trace period, partly to accommodate the field retrace period being shorter than field trace period. But also the fast clocking of A register 11 and B register 12 in synchronism is at as high rate as feasible to reduce the amount of transfer smear introduced into the transferred image sample charges.

The synchronous clocking of A register 11 and B register 12 is then continued after the field transfer interval for a "further field transfer interval". This continued synchronous clocking of the A register 11 and B register 12 places smear charge samples in the row(s) of B register behind those rows to which the L final lines of charge samples descriptive of previously integrated image are transferred. This, even though there is no masked row at the end of A register 11 remote from its end connecting to the B register.

FIG. 1 shows CCD imager 10 being used in conjunction with an electronic switch 15 that is switched from normal position to select, for storage in a line store memory 16, a line of smear charge samples as it is clocked out of B register 12 and through C register 13. The smear charge samples in line store 16 are serially supplied as subtrahend to a subtractor 17 during the follow field trace interval, to be subtracted from charge samples originating from corresponding columns in A register 10, supplied as minuend to subtractor 17 by electronic switch 15 returned to its normal condition. The video output from subtractor 17 has the reduced smear sought in practicing the invention. The timing of the smear samples so they appear in synchronism with the video plus smear samples with which they are differentially combined is arranged by successively column addressing line store 16 at pixel rate if it is an adressable memory or by timing its recirculation if it is a recirculating serial memory.

Line store 16 may be a recirculating analog delay line or may comprise the cascade connection of an analog-to-digital converter, a digital memory of serial or random-access type and a digital-to-analog converter. While electronic switch 15, line store 16 and subtractor 17 are depicted in FIG. 1 as being external to CCD imager 10, it is possible to integrate the elements on a monolithic semiconductor die. The FIG. 1 system may be modified replacing electronic switch 15 with a more complex selector switch which selects successive lines of smear charge samples from the output of C register 13, adding additional line stores besides 16 for the other lines of smear charge samples, and averaging the line store outputs to provide transversal filtering of the smear charge samples supplied as subtrahend to subtractor 17. Or the transversal filtering of the lines of smear charge samples can be done by accumulating in line store 16 without need for further line stores. Such transversal filtering of smear charge samples can reduce dark current variations introduced in the passage of smear samples through the B register, which takes most of a field trace time.

As shown in FIG. 2 the field transfer and further field transfer intervals can take up the entire time of field retrace, with clocking of A register 11 immediately thereafter being halted and the clocking of B register and C register 13 being returned to relatively slow rates. B register 12 and C register then cooperate to clock out serial-in-time samples of the $K^{th}$ image as samples of the $(K+1)^{th}$ image accumulate in A register 11. Alternatively, the field retrace time may be longer than the field transfer and further field transfer intervals with clocking then being halted in all three registers 11, 12 and 13 as in certain prior art practice.

C register 13 is shown in FIG. 2 as being clocked for clearance during the field retrace interval, per most common practice, but variants of this procedure may be followed. e.g., C register 13 clocking can be halted during retrace. Charge can overflow into the C register and be conducted away by adjacent drain structure, or it can be forced to pile up in the final rows of the B register to overflow into adjacent drain structure. Then the initial line or two of the field can be discarded in the video output signal.

The A, B and C registers of FIG. 1 CCD imager 10 are always clocked to move charge in one direction from A register to B register to C register so smear charge samples are subjected to the field delay through B register 12. Other CCD imager configurations allow the smear charge samples to appear before rather than after the corresponding field of image charge samples, as is revealed in my above-referenced U.S. Pat. No. 4,490,744. The invention may be practiced using these types of CCD imager.

FIG. 3 shows a modification of the FIG. 1 system wherein CCD imager 10 is replaced by a CCD imager 20. Imager 20 is of field transfer type, but has its C register 23 located between its A register 21 and B register 22, and transfer of the field of charge samples from A register 21 to B register 22 during field retrace time is through C register 23, the clocking of which is halted during field retrace time. The L unmasked rows of A register 21 are centrally located and are flanked by M rows on each side to forestall creep-under on either side. The charge samples from the final M masked rows of A register 21 are clocked through C register 23 and B register 22 to an end drain 24 at the beginning of the field transfer interval. B register 22 is clocked in opposite direction during read-out in the field trace period than it is in the field retrace time. Electronic switch 25 selects a line of smear charge samples from C register 23 at the beginning of the field, rather than at its finish. If CCD imager 20 has very few rows in its A and B registers, it may be convenient to make the B register 22 have an equal number of rows as in the unmasked portion of the A register 21, with the line of smear charge samples behind the field of image samples transferred to B register 22 left in C register 23 at close of field retrace time.

FIG. 4 shows another modification of the FIG. 1 system wherein CCD imager 10 is replaced by a CCD imager 30 having a parallel-to-serial-converting line register or "D register" 34 at the end of its A register 31 remote from its B register 32 and C register 33. D register 34 is for serially supplying smear charge samples. During the further field transfer interval, operation differs from that shown in the FIG. 2 timing diagram in the following way. B register clocking is halted, and A register clocking is reversed in direction for a length of time sufficient to move the line of initially empty-well charge samples (caused by halting of B register 32 clocking) across the L+M rows of the A register 31 to D register 34. These charge samples supplied in parallel from A register 31 to corresponding stages in D register 34 are shifted serially into line store 16 to provide for smear reduction in subtractor 17 video output signal in the ensuing field trace time. The remnant charge samples in A register 31 are then erased responsive to image register erase control 35, preparatory to the next field time of image integration. While theoretically it is possible to operate D register 34 as a recirculating analog delay line to eliminate the need for a separate line store 16, in practice imperfect transfer efficiency makes this approach unattractive at the present state of the art.

Figure 5:
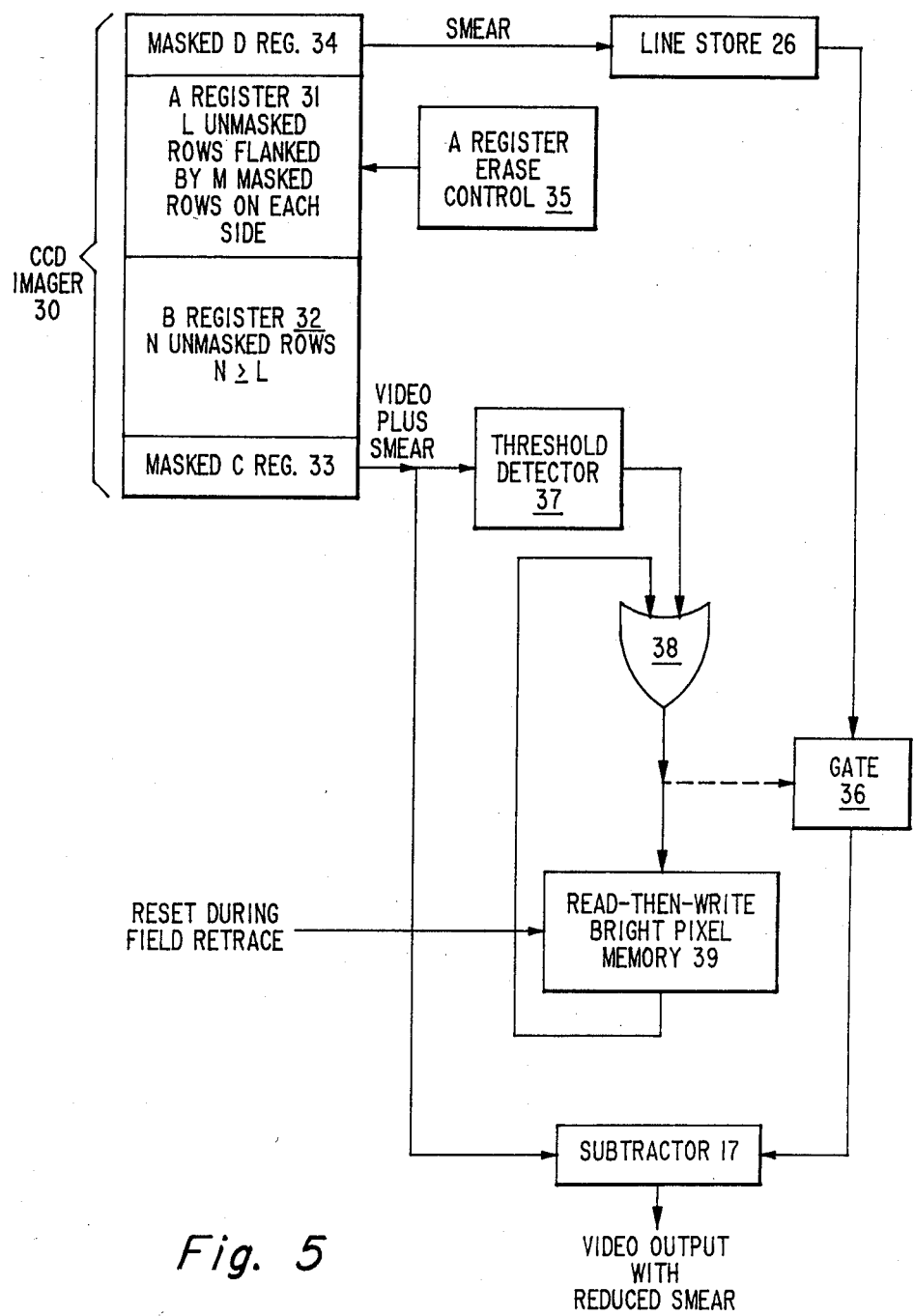

FIG. 5 shows CCD imager 30 in conjunction with elements for accommodating more complete suppression of smear despite relative movement between imager and bright spots parallel to the direction of line scan. The configurations of FIGS. 1, 3 and 4 provide satisfactory smear suppression where bright spots remain stationary in the image field projected to the CCD imager. The operation of the FIG. 5 apparatus will now be considered.

Following the reverse clocking of the A register 31 to transfer a line of empty wells from its end next to B register to the D register 34, the A register is erased of charges. If the A register is a surface channel type this erasure can be done by driving its CCD stages into accumulation as described in my U.S. Pat. No. 4,032,976 issued June 28, 1977 and entitled "SMEAR REDUCTION IN CCD IMAGERS". If the A register is a buried channel type with anti-blooming drains provided with dynamic control of anti-blooming drain voltage, erasure can be accomplished by reducing differences in the bias voltages applied to gate electrodes of the A register, to collapse the storage wells in the A register and cause any charge in them to flow into the anti-blooming drains. This A-register-erasing procedure eliminates smear charge which would otherwise be left in A register columns between bright spots and the end of the A register abutting the B register. So, every smear charge component contaminating the video from the C register 33 will have arisen in the same image integration time as the image charge component that the smear charge component accompanies. And the smear component will only appear with significant intensity in lines of video clocked through C register after a bright spot occurs.

A gate 36 will transfer smear charge samples from line store 26 to subtractor 17 for only those columns for which a bright spot appears in that column in the line being clocked from C register 33 or as already appeared in that column in an earlier line of the field. In order to control gate 36, a threshold detector 37 detects when a bright spot occurs in the video output of C register 33. A logic ONE as an indication of the occurrence of a bright spot applied as a first input to an OR gate 38 causes its output to provide a logic ONE. This ONE conditions gate 36 to pass the smear charge sample associated with current column address from line store 26 to subtractor 17, and is written into the read-then-write line store 39 used as a bright pixel memory. In any succeeding line of the field when the column address reoccurs, the ONE stored in read-then-write memory 39 is read out as a second input to OR gate 38, to cause its output to be logic ONE and condition gate 36 again to pass the smear charge sample. The logic ONE is re-written into memory 39 on its write cycle.

Memory 39 is reset to logic ZERO at every column address during field retrace. Then at any column address during the successive field, until a bright spot is reached at that column address, the logic ZERO read from memory 39 and the logic ZERO provided from threshold detector absent a bright spot cause OR gate 38 output to be logic ZERO. Gate 36 is conditioned, responsive to the logic ZERO output of OR gate 38, not to pass a smear charge sample from that column address location in line store 26 to subtractor 17.

Figure 6:
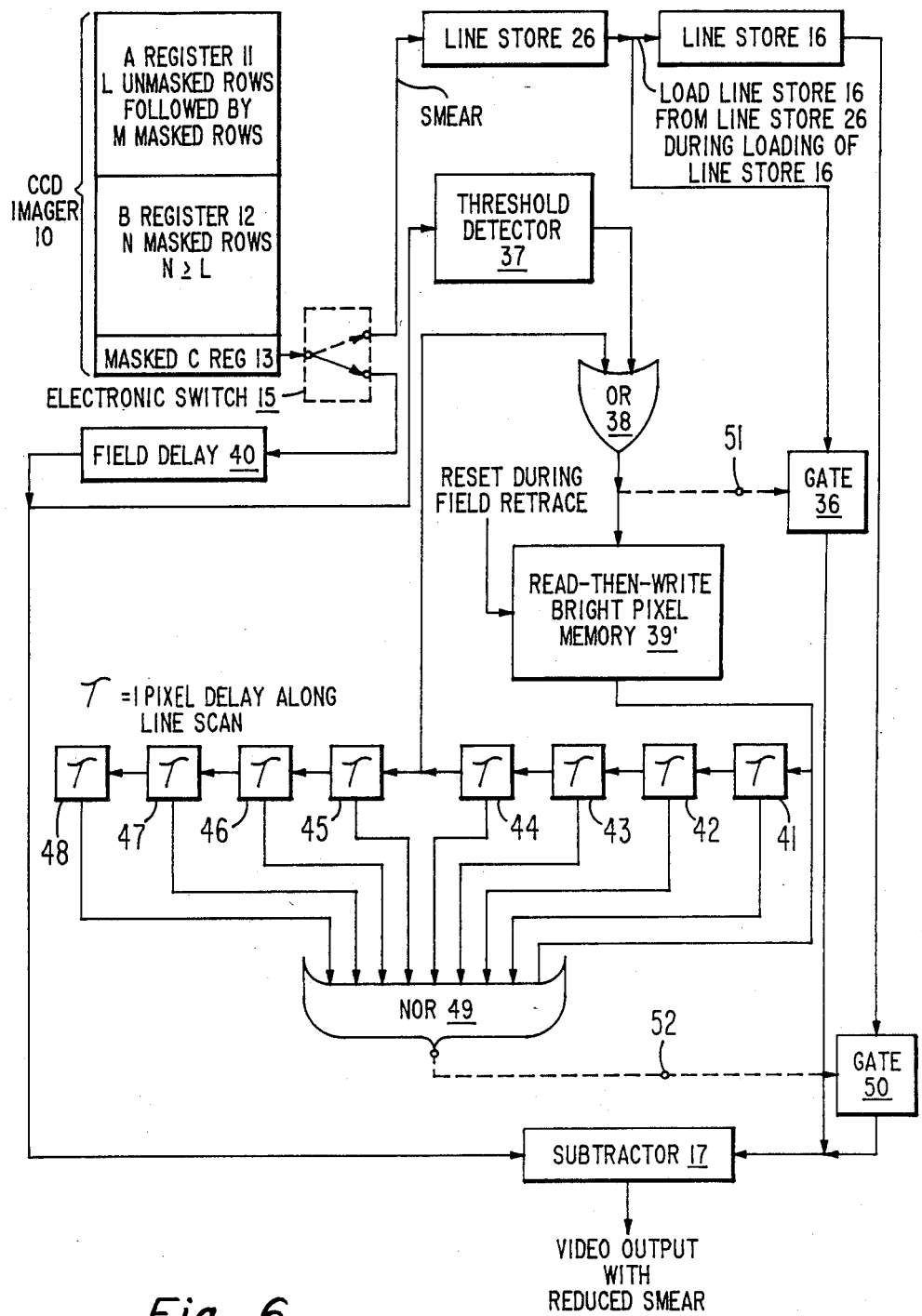

FIG. 6 shows how the CCD imager 10 may be operated to provide smear suppression that is essentially unaffected by relative movement between the imager and bright spots along a direction parallel to line scanning. When empty-well clocking is used to place a line of smear samples into the B register of such an imager, the line of smear samples is clocked out of the B register later than the first field of image samples contaminated by that smear. A field delay 40 is used to delay the image plus smear samples from C register 13 by one field duration before application to threshold detector 37 and to subtractor 17. This is done to position the image plus smear samples in time so as to follow the line of smear samples, which has been read into line store 26 when electronic switch 15 is switched from its normal position at end of field trace. While a new line of smear samples is being loaded into line store 26, the old line of smear samples is loaded into line store 16. Line store 26 then holds smear samples generated in the same field as the image plus smear samples supplied from the output of field delay 40, and line store 16 holds smear samples generated in the previous field.

In FIG. 6 as in FIG. 5 gate 36 forwards the smear sample for any given column address from line store 26 to subtractor 17 only after a bright spot is encountered in that column during field trace. FIG. 6 differs from FIG. 5 in that until a bright spot is encountered in a column or one of the close-by columns, smear samples from the previous field must be supplied from line store 16 to subtractor 17 in order to suppress smear in the video output from subtractor 17. The column addressing of bright pixel memory 39' is advanced $4\tau$ relative to the column addressing of field delay 40 output signal, $\tau$ being one-pixel duration along scan line; and the output of bright pixel memory 39' is subjected to four one-pixel delays 41–44 before application as second input to OR gate 38. The output of bright pixel memory four 39', the output of that memory 39' with successively greater delays introduced by cascaded one-pixel delays 41–44, and the output of that memory delayed by the further cascaded one-pixel delays 45–48 are applied as inputs to a NOR gate 49. NOR gate 49 then supplies a logic ONE output until such time as a bright object is encountered in a column or in any column up to four columns away. NOR gate 49 logic ONE output selectively enables gate 50 to pass smear samples from the line store 16 to subtractor 17.

The broadening of the bright pixel content in memory 39' at the output of NOR gate 49 makes allowance for the change in bright spot location likely to have taken place between the fields in which smear samples in line stores 16 and 26 originate, either due to imager motion or to CCD imager panning. The number of pixels of broadening may be smaller or larger than four and the number can be adjusted responsive to circuitry for detecting motion in the image the video output describes.

One skilled in the art will discern that the cascade loading of line stores 26 and 16 in FIG. 6 (or the following FIGS. 7 and 8) can be replaced by a pair of line stores multiplexed at line rate for reading and for re-writing one of them each field trace. Note connection points 51 and 52 are located at the control connections of gates 36 and 50, respectively, in FIG. 6.

Figure 7:
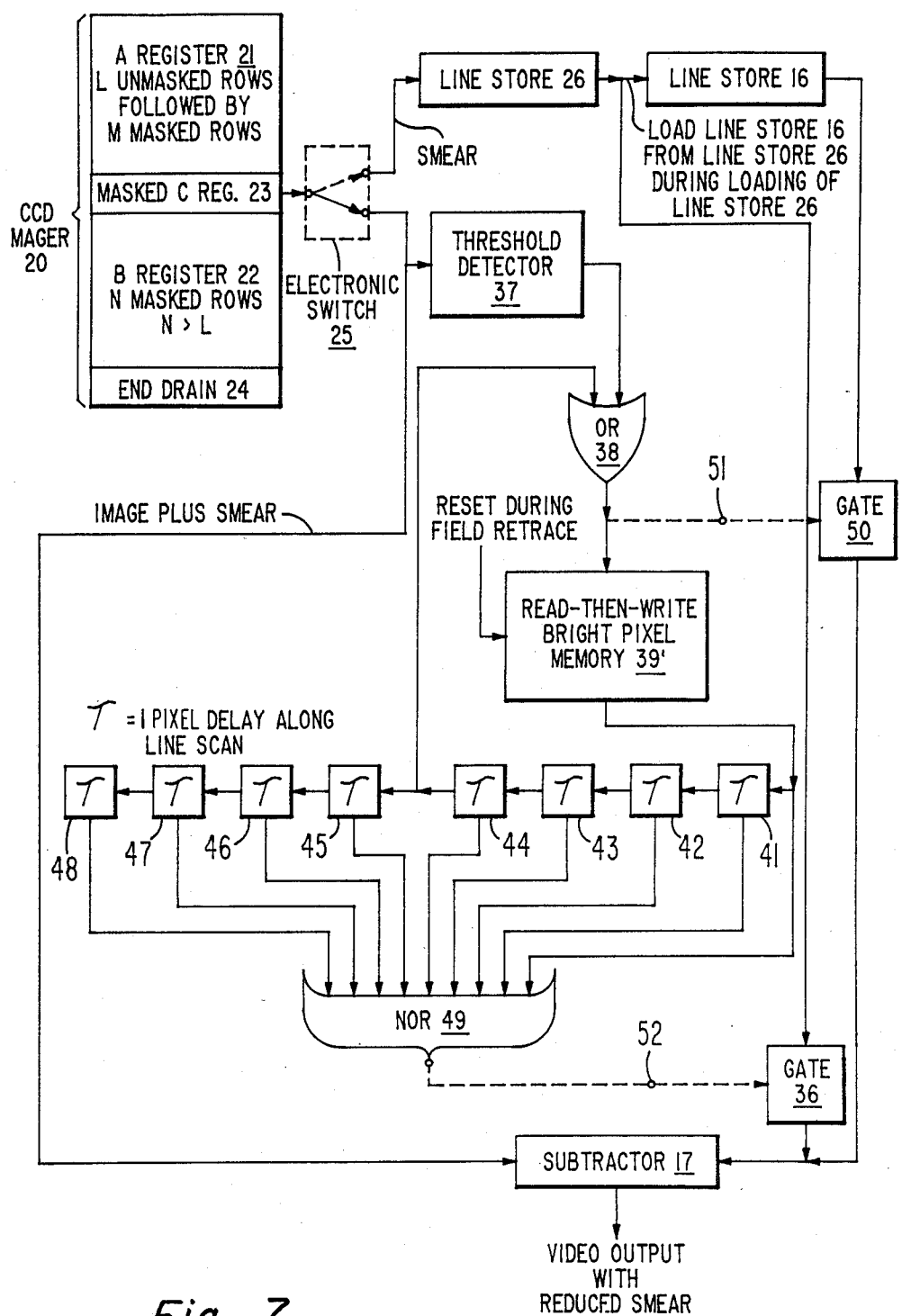

FIG. 7 shows a connection of CCD imager 20 to suppress transfer smear even when there is relative movement between it and bright spots in the image field, in a direction parallel to line scan. In CCD imagers with C register located between the A and B registers transfer smear samples are clocked out of the B register and through the C register before image samples contaminated with corresponding smear components, so there is no need or desirability for the field delay 40 as used with CCD imagers having A and C registers on opposite ends of the B register. Further, the clocking of lines out of the B register in opposite order means that smear generated during transfer of a field appears in portions of the columns in that field preceding a bright spot, and in the portions of the columns of that field following a bright spot smear will be attributable to transfer of the preceding field. Therefore electronic switch 25 will be thrown from normal position to load one of the first lines out of C register 23 during a field trace into line store 26 as its former contents are transferred into line store 16. Gates 36 and 50 are supplied control signals via terminals 52 and 51, respectively, rather than via terminals 51 and 52 as would be the case with CCD imager 10 or its like.

Figure 8:
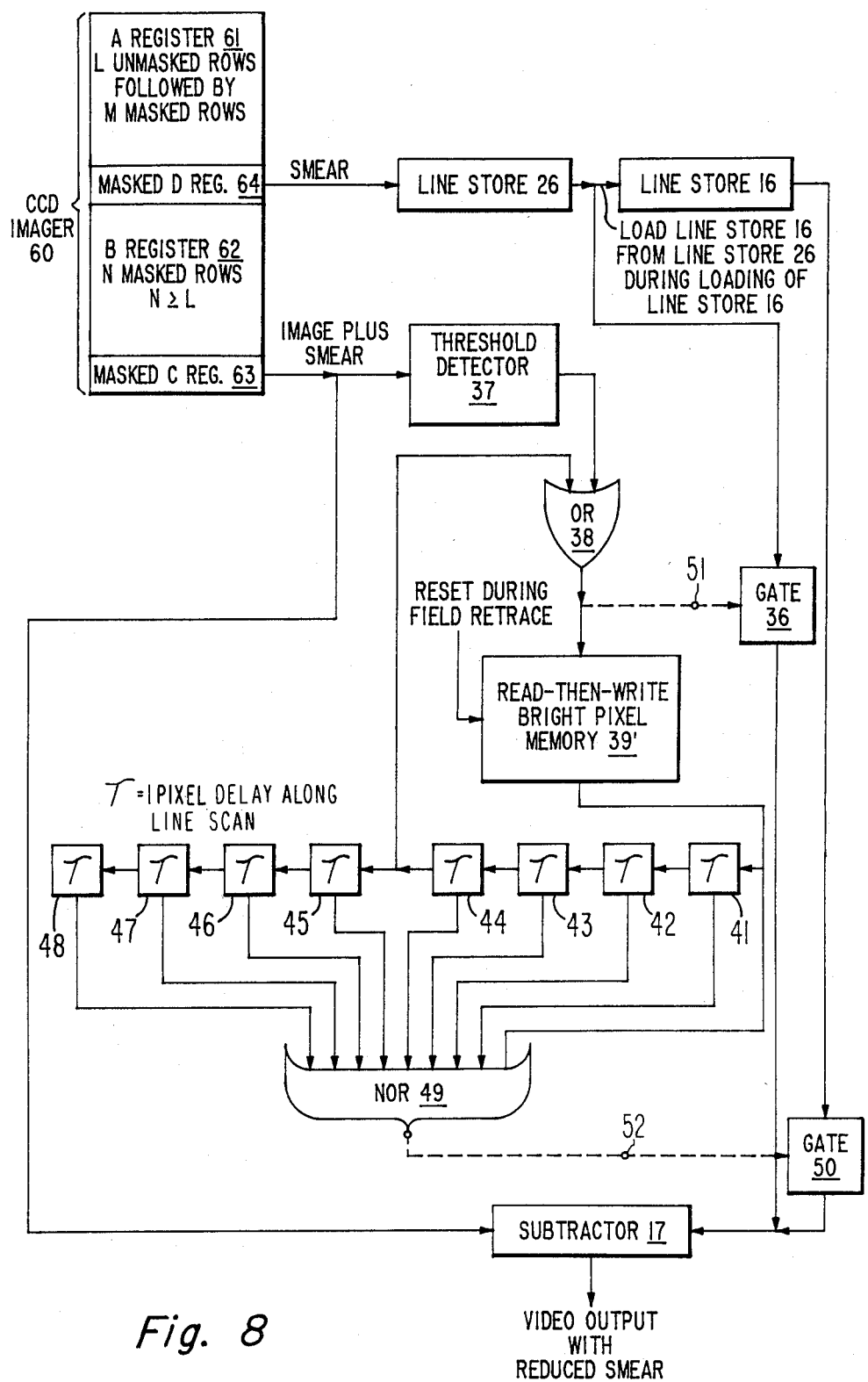

FIG. 8 shows a smear suppression scheme similar to that of FIG. 7 but using a CCD imager 60. CCD imager 60 has an A register 61, a subsequent B register 62, and a subsequent C register 63; and B register clocking is in the same direction during both field retrace and field trace. Smear samples are not taken from C register 63, but instead are taken from a D register 64. The smear samples are read into D register 64 in parallel, by continuing the clocking of A register 61 for a further field transfer interval following the normal field transfer interval. The smear samples are read out serially from D register 64 line store 26 before read out of video plus smear samples from C register 63 during field trace. Since B register clocking during field trace is in the opposite direction in CCD imager 60 as it is in CCD imager 20, gates 36 and 50 receive their control voltages from terminals 52 and 51, respectively.

What is claimed is:

1. A method for reducing transfer smear in video output signal originating from a CCD imager of field transfer type, which method comprises the steps of:
   continuing to clock the image or A register of the CCD imager after its entire contents at the time that field transfer clocking began, including samples of image charge, are clocked from the A register to the field store or B register during field retrace time, for introducing a line of empty well samples into said A register from a non-existent or phantom row register and advancing them across said A register to accumulate a line of smear samples;
   storing, for at least the ensuing field trace time, a line of smear charge samples clocked from the A register during said continued clocking, and
   using the stored smear charge samples to reduce the smear in samples of image charge taken from the B register during that ensuing field trace time.

2. A method as set forth in claim 1 wherein said continuing clocking of the A register is in the same direction as the clocking of samples of image charge to the B register.

3. The method of claim 2 used with a CCD imager of the type having its A register and a parallel-to-serial-converter, or C, register thereof at opposite ends of its B register, smear charge samples being taken from a final line clocked from said B register and through said C register during each field trace time.

4. A method as set forth in claim 1 used with a CCD imager of the type having a parallel-to-serial-converter, or C, register interposed between its A and B registers, smear charge samples being taken from an initial line clocked from said B register and through said C register during each field trace time.

5. A method as set forth in claim 1 used with a CCD imager of the type having its A register and a first parallel-to-serial-converter, or C, register at opposite ends of its B register and having a second parallel-to-serial-converter, or D, register at the opposite end of its A register from its B register, wherein said continued clocking of the A register is in the opposite direction as the clocking of samples of image charge to the B register and continues for sufficient time to clock the phantom line of empty well samples across said A register to said D register for accumulating a line of smear samples, after which the smear samples are serially transferred from said D register for storing.

6. A CCD camera, for operating unshuttered during field retrace, comprising:
   a CCD imager of field transfer type having an at least partially unmasked A register with first and second ends, a masked B register with a first end into which charge packets descriptive of image elements are loaded from the second end of said A register during field transfer time in the field retrace, during which time said A and B registers are clocked synchronously, and a masked C register divided into cascaded stages into which a second end of said B register during line retrace parallelly loads charge packets descriptive of image elements, from which C register charge packets descriptive of image elements are serially supplied during the line trace, the synchronous clocking of the A and B registers of which CCD imager is continued after field transfer so as to introduce into said A register a line of empty wells from a non-existent of phantom row register and to complete the movement of charge packets descriptive of said line of empty wells plus accumulated smear across the length of the A register and into the B register; and
   means responsive to samples of said C register output signal for providing video output with reduced smear.

7. A CCD camera as set forth in claim 6 wherein said means for providing video output with reduced smear comprises:
   an electronic switch for selectively routing output signal samples from the C register of said CCD imager;
   a line store into which selected samples of said C register output signal, descriptive of smear, are serially transferred from said C register at the completion of field trace via the selective routing provided by said electronic switch, said line store recurrently read out in synchronism with said C register during the next field trace interval; and
   a subtraction circuit for supplying video output with reduced smear, responsive to image samples contaminated with transfer smear supplied from said C register output, via the selective routing provided by said electronic switch, less said output signal samples descriptive of smear read out from said line store.

8. A CCD camera, for operating unshuttered during field retrace, comprising:
   a CCD imager of field transfer type having an at least partially unmasked A register with first and second ends, a masked B register with a first end into which charge packets descriptive of image elements are loaded from the second end of said A register during field transfer time in the field retrace, during which time said A and B register are clocked synchronously, and a masked C register divided into cascaded stages into which during line retrace a second end of said B register parallelly loads charge packets descriptive of image elements, from which C register charge packets descriptive of image elements are serially supplied during line trace, the synchronous clocking of the A and B registers of which CCD imager is continued after field transfer so as to complete the movement of charge packets descriptive of a line of empty wells plus accumulated smear across the length of the A register and into the B register;

an electronic switch for selectively routing output signal samples from the C register of said CCD imager;

a first line store into which selected samples of C register output signal, descriptive of smear, are serially transferred from said C register at the completion of field trace via the selective routing provided by said electronic switch, said line store recurrently read out in synchronism with said C register during the next field trace interval to supply samples of a less delayed smear signal;

a second line store into which samples of said less delayed smear signal are transferred from said first line store at the completion of field trace, said second line store recurrently read out in synchronism with said C register during the next field trace interval to supply samples of a more delayed smear signal;

delay means for delaying by a field time samples of C register output signal not selected by said electronic switch for transfer into said first line store;

threshold detector means, responding to delayed C register output signal samples from said delay means of level greater than a prescribed threshold, for generating a bright spot indication;

memory means for storing locations along a line where bright spot indications are generated by said threshold detector;

means responsive to said stored locations for regenerating (those) bright spot indications on succeeding lines in the same field trace period;

a selection circuit for providing a selection between samples of said less delayed smear signal and said more delayed smear signal for each sample position in each line of the field, a sample of said less delayed smear signal being selected if a bright spot indication is furnished for that sample position, and a sample of said more delayed smear signal being selected otherwise;

a subtraction circuit for supplying video output with reduced smear, responsive to image samples contaminated with smear and delayed a field time as supplied from said delay means, less smear signal samples selected by said selection circuit.

9. A CCD camera, for operating unshuttered during field retrace, comprising:

a CCD imager of field trace type having an at least partially unmasked A register with first and second ends, a masked B register with first and second ends, and a masked C register disposed between the second end of said A register and the first end of said B register, through the cascaded stages of which C register charge packets descriptive of image elements are transferred from the second end of said A register into the first end of said B register during field transfer intervals when the A and B registers are forward clocked synchronously, said forward clocking being continued after field transfer so as to complete the movement of charge packets descriptive of a line of empty wells plus accumulated smear across the A register and into one of the other of said B and C registers, into the cascaded stages of which C register the first end of said B register during line retrace parallelly loads charge packets descriptive of image elements, and from the cascaded stages of which C register output signal samples descriptive of said line of empty wells plus accumulated smear charge are serially supplied during an initial line trace and output signal samples descriptive of lines of image elements are serially supplied during successive line traces in the field trace interval; and means responsive to samples of said C register output signal for providing video output with reduced smear.

10. A CCD camera as set forth in claim 9 wherein said means for providing video output with reduced smear comprises:

an electronic switch for selecting samples of the output signal of said C register which are descriptive of said line of empty wells plus accumulated smear charge from samples of the output signal of said C register which are descriptive of said lines of image elements;

a line store into which selected samples of C register output signal, descriptive of smear, are serially transferred just prior to field trace, said line store recurrently read out in synchronism with said C register during the ensuing field trace interval; and a subtraction circuit for supplying video output with reduced smear responsive to non-selected signal samples supplied from said C register via said electronic switch, less samples of smear read out from said line store.

11. A CCD camera, as set forth in claim 9 wherein said means for providing video output with reduced smear comprises:

an electronic switch for selecting samples of the output signal of said C register which are descriptive of said line of empty wells plus accumulated smear charge from samples of the output signal of said C register which are descriptive of said lines of image elements;

a first line store into which selected samples of C register output signal descriptive of smear are serially transferred just prior to field trace, said line store recurrently read out in synchronism with said C register during the ensuing field trace interval to supply samples of a less delayed smear signal; and a second line store into which samples of said less delayed smear signal are transferred from said first line store just prior to field trace, said second line store recurrently read out in synchronism with said C register during the next field trace interval to supply samples of a more delayed smear signal;

threshold detector means, responding to C register output signal samples supplied via said electronic switch during field trace which samples are of level greater than a prescribed threshold, for generating a bright spot indication;

memory means for storing locations along a line where bright spot indications are generated by said threshold detector means;

means responsive to said stored locations for regenerating those bright spot indications on succeeding lines in the same field trace period;

a selection circuit for providing a selection between samples of said less delayed smear signal and said more delayed smear signal for each sample position in each line of the field, a sample of said more delayed smear signal being selected if a bright spot indication is furnished for that sample position, and a sample of said less delayed smear signal being selected otherwise;

a subtraction circuit for supplying video output with reduced smear, responsive to image samples contaminated with smear and delayed a field time as supplied from said delay means, less smear signal samples selected by said selection circuit.

12. A CCD camera, for operating unshuttered during field retrace, comprising:

a CCD imager of field transfer type having an at least partially unmasked A register with first and second ends, a masked B register with a first end into which charge packets descriptive of image elements are loaded from the second end of said A register during field transfer in field retrace, a masked C register divided into cascaded stages into which a second end of said B register during line retrace parallelly loads charge packets descriptive of image elements, from which C register charge packets descriptive of image elements are serially supplied during line trace, and a masked D register into cascaded stages of which the first end of said A register parallelly loads charge packets descriptive of a line of empty wells plus accumulated smear during reverse clocking of A register after field transfer for such time as to introduce a line of empty wells from a non-existent or phantom row register into the second end of said A register and to move charge packets descriptive of said line of empty wells across the length of A register for accumulating smear;

means for erasing stored charge from said A register following each such reverse clocking thereof; and means responsive to samples of a signal descriptive of smear serially transferred from said D register at the beginning of field trace and to samples of a signal descriptive of image elements during the remainder of field trace for providing video output with reduced smear.

13. A CCD camera as set forth in claim 12 wherein said means for providing video output with reduced smear comprises:

a line store into which samples of a signal descriptive of smear are serially transferred from said D register at the beginning of field trace, said line store recurrently read out in synchronism with said C register during field trace to supply samples of smear signal; and a subtraction circuit for supplying video output with reduced smear, responsive to image samples contaminated with transfer smear from said C register output, less samples of smear signal read out from said line store.

14. A CCD camera as set forth in claim 12 wherein said means for providing video output with reduced smear comprises:

a line store into which samples of a signal descriptive of smear are serially transferred from said D register at the beginning of field trace, said line store recurrently read out in synchronism with said C register during field trace to supply samples of smear signal;

a gate responsive to a control signal for selectively transmitting samples of smear signal read out from said line store;

a subtraction circuit for supplying video output with reduced smear, responsive to image samples contaminated with transfer smear from said C register output, less samples of smear signal read out and selectively transmitted from said line store;

threshold detector means, responding to C register output of sufficient level to be identified as descriptive of a bright spot imaged on said A register, for generating a control signal supplied to said gate for selectively transmitting, to condition that gate for transmitting samples of smear signal read out from said line store; and memory means for storing locations along a line where control signal is generated to regenerate said control signal at those locations on succeeding lines in the same field trace period.

15. A CCD camera, for operating unshuttered during field retrace, comprising:

a CCD imager of field trace type having an at least partially unmasked A register with first and second ends, a masked B register with first and second ends, a masked C register divided into cascaded stages into which C register the second end of said B register parallelly loads during line retrace charge packets descriptive of image elements, and a masked D register disposed between the second end of said A register and the first end of said B register, through the cascaded stages of which D register charge packets descriptive of image elements are transferred from the second end of said A register into the first end of said B register during field transfer intervals when the A and B registers are forward clocked synchronously, said forward clocking being continued after field transfer so as to complete the movement of charge packets descriptive of a line of empty wells plus accumulated smear across the A register and into the D register, from the cascaded stages of which D register output signal samples descriptive of said line of empty wells plus accumulated smear charge are serially supplied during an initial line trace in the field trace interval, and from the cascaded stages of which C register output signal samples descriptive of lines of image elements are serially supplied during successive line traces in the field trace interval;

a line store into which samples of D register output signal are serially transferred just prior to field trace, said line store recurrently read out in synchronism with said C register during the ensuing field trace interval to supply samples of a less delayed smear signal;

a second line store into which samples of said less delayed smear signal are transferred from said first line store just prior to field trace, said second line store recurrently read out in synchronism with said C register during the next field trace interval to supply samples of a more delayed smear signal;

threshold detector means responding to C register output signal samples supplied via said electronic switch during field trace which samples are of level greater than a prescribed threshold, for generating a bright spot indication;

memory means for storing locations along a line where bright spot indications are generated; by said threshold detector;

means responsive to said stored locations for regenerating (those) bright spot indications on succeeding lines in the same field trace period;

a selection circuit for providing a selection between samples of said less delayed smear signal and said more delayed smear signal for each sample position in each line of the field, a sample of said more delayed smear signal being selected if a bright spot indication is furnished for that sample position, and a sample of said less delayed smear signal being selected otherwise;

a subtraction circuit for supplying video output with reduced smear, responsive to output signal samples contaminated with smear as supplied from said C register, less smear signal samples selected by said selection circuit.

16. A CCD imager of field transfer type operated in conjunction with smear suppression circuitry, which imager comprises:

an A register comprising a plurality of parallelled charge transfer channels between a first end thereof and a second end thereof, said A register having a number L of unmasked rows flanked by a number M of masked rows at its first end and a number M of masked rows at its second end;

a B register comprising a plurality of parallelled charge transfer channels between a first end thereof and a second end thereof, its first end abutting the second end of said A register so respective ones of their parallelled charge transfer channels are in alignment with each other, said B register having L rows all of which are masked;

a C register comprising a cascade of charge transfer stages arranged in a masked charge transfer channel abutting the second end of said B register, respective ones of its charge transfer stages being aligned with respective ends of the paralled charge transfer channels of said B register so charge packets may be parallelly loaded therefrom; and a D register comprising a cascade of charge transfer stages arranged in a masked charge transfer channel abutting the first end of said A register, respective ones of its charge transfer stages being aligned with respective ends of the parallelled charge transfer channels of said A register so charge packets may be parallelly loaded therefrom.

17. A CCD imager of field transfer type, which imager comprises:

an A register comprising a plurality of parallelled charge transfer channels between a first end thereof and a second end thereof, said A register having a number L of unmasked rows at its first end and a number M of masked rows at its second end;

a B register comprising a plurality of parallelled charge transfer channels between a first end thereof and a second end thereof, said B register having a number N of rows all of which are masked, N being a number at least as large as L;

a C register comprising a cascade of charge transfer stages through which cascade charge packets may be serially transferred, said charge transfer stages arranged in a masked charge transfer channel abutting the second end of said B register, respective ones of the charge transfer stages in said C register being aligned with respective ends of the paralled charge transfer channels of said B register so charge packets may be parallelly loaded from the second end of said B register into said C register; and a D register comprising a cascade of charge transfer stages through which cascade charge packets may be serially transferred, said charge transfer stages arranged in a masked charge transfer channel between the second end of said A register and the first end of said B registers, respective ones of the charge transfer stages in said D register being aligned with respective ends of the parallelled charge transfer channels of said A register, so charge packets may be parallelly loaded from the second end of said A register into said D register, and being aligned with respective ends of the parallelled charge transfer channels of said B register, so charge packets may be parallelly loaded from said D register into the first end of said B register.

* * * * *